(No Model.)
E. KNIGHT.
LETTER SCALE AND COIN TESTER.
No. 388,138. Patented Aug. 21, 1888.
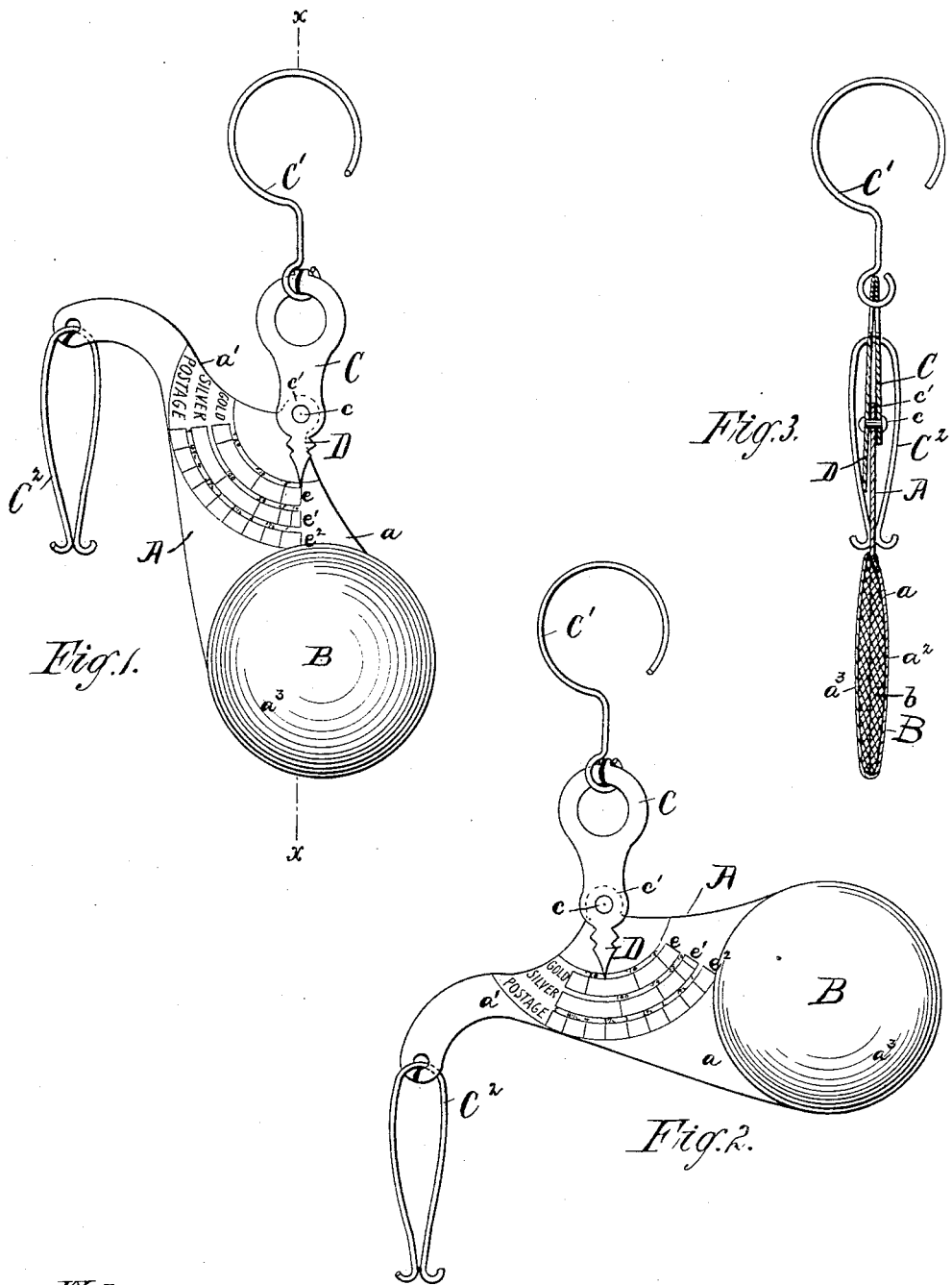
Witnesses.
C. W. Benjamin.
A. T. Fales.
Inventor,
Edgar Knight.
By Arden J. Fitch.
atty.

UNITED STATES PATENT OFFICE.

EDGAR KNIGHT, OF SAYBROOK, CONNECTICUT.

LETTER-SCALE AND COIN-TESTER.

SPECIFICATION forming part of Letters Patent No. 388,138, dated August 21, 1888.

Application filed September 2, 1887. Serial No. 248,568. (No model.)

*To all whom it may concern:*

Be it known that I, EDGAR KNIGHT, of Saybrook, county of Middlesex, State of Connecticut, a citizen of the United States, have invented an Improved Letter-Scales and Coin-Tester, of which the following is a full, clear, and exact description, reference being had to the accompanying drawings, forming part of this specification.

My invention relates to a combined letter-scale and coin-tester; and it consists in the combination of devices hereinafter described, and as more at length recited in the claim.

Figure 1 is a front elevation of the instrument containing my invention, and showing it at rest. Fig. 2 is a similar view of the same, showing it in the operation of weighing; and Fig. 3 is a longitudinal section on the line $xx$, Fig. 1.

A is the beam, consisting of a metal plate, which is pivoted to oscillate in a clip, C, by means of a pin, $c$, passed loosely through the beam at $c'$ and through the clip. The upper end of the clip is perforated, as shown, so that the instrument may be suspended by the clip. The clip is desirably furnished with a hook, C', which is loosely linked into the perforated end of the clip as furnishing a convenient means for suspending the clip. The clip is preferably composed of two limbs, as shown, with the beam seated loosely between them. The portion $a$ of the plate-beam A contiguous to the fulcrum pin $c$ is wide-faced or broad in extent, and upon this wide-faced portion $a$ I form or place indicator-scales $e$ $e'$ $e^2$, one or more, each in the shape of or describing an arc of a circle of which the fulcrum-pin $c$ is the center. The clip C is extended past the fulcrum-point $c$, and its extended end lies over the wide-faced scale portion $a$ of the plate-beam, and constitutes a pointer, D, which ranges over said portion $a$ of the beam when the beam oscillates in the clip.

One end of the plate-beam is weighted, as at B. This may be effected by forming a concavity, $a^2$, in the plate, placing therein a corresponding weight, $b$, and then covering the weight with a cap, $a^3$. A beam of desirable appearance is thus produced. The opposite arm $a'$ of the beam is provided with a holder, $C^2$, in the form, preferably, of a spring-wire clip linked loosely to the end of said arm. The arm $a'$ is desirably narrow, as shown, and has a downward curve at its free end.

The indicator-scales $e$ $e'$ $e^2$, each or all, are so arranged on the portion $a$ of the beam relatively to the pointer D that when the beam gravitates to rest in the suspending-clip C the said pointer will indicate zero on the scale or scales. The scale $e^2$ may then be marked or graduated to indicate ounces and fractions thereof for use in weighing postal matter, while the scales $e$ $e'$ may be graduated to indicate the correct weight of gold and silver coins, respectively, as shown in the drawings.

Heretofore in constructing postal and analogous scales of this description—namely, with a suspended beam, a suspending-clip, and a weighted arm on said beam—the indicator scale or scales have been placed upon the face of the extremity of the weighted arm, and an independent pointer has been loosely pivoted upon the face of said arm and allowed to gravitate over said scale or scales for the purpose of indicating the weight of articles suspended on the opposite arm; but in operating scales thus constructed the pointer is exceedingly liable to get out of proper adjustment relatively to the indicator-scales on the weighted arm, and therefore to indicate inaccurately on the scales. By means of an apparatus constructed as I have herein described, the pointer being a part of the suspending-clip C and ranging over the scale portion $a$ of the beam all liability of inaccuracy is obviated.

I do not claim, broadly, herein the combination, with a pointer carried by the suspending-clip, of a graduated beam over which said pointer ranges, as I am aware that such devices are not new. I intend to limit my claim hereunder to the combination, with the peculiar scale-beam shown, consisting of a plate fulcrumed at one edge, between its ends, in a suspending-clip and having one end weighted, of an indicator scale or scales in the form of an arc of a circle of which the fulcrum is the center, on said plate-beam, and a pointer constituted by an extension of the suspending-clip and ranging over the arc-scales on said beam.

What I claim as my invention, and desire to secure by Letters Patent, is—

In weighing-scales, the combination of the plate A, constituting the scale-beam, and pivoted or fulcrumed at one edge between its ends to the suspending-clip C, and provided with the weight B and the clip C² at opposite ends of said beam, respectively, and having a graduated scale, one or more, in the form of the arc of a circle of which the fulcrum is the center on its side face, as described, with a pointer, D, constituted by an extension of the suspending-clip over the side face of the beam, and adapted to range over the graduated scale, as and for the purpose specified.

EDGAR KNIGHT.

Witnesses:
HENRY KNIGHT,
JOSEPH KELLOGG.